Figure 1:
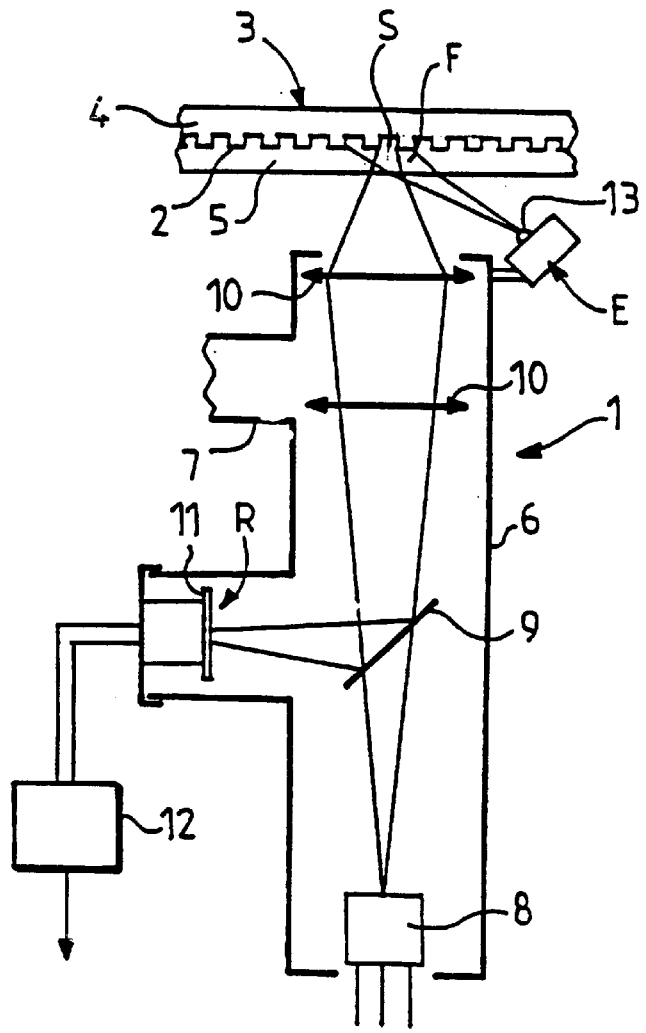

United States Patent [19]
Andre

[11] Patent Number: 6,151,291
[45] Date of Patent: Nov. 21, 2000

[54] DEVICE FOR OPTICALLY READING DIGITAL DATA FROM A MEDIUM, PARTICULARLY A LASER DISK READER DEVICE

[76] Inventor: Yves Bernard Andre, 22, rue de Frileuse, F-91440 Bures-sur-Yvette, France

[21] Appl. No.: 09/125,728

[22] PCT Filed: Nov. 26, 1996

[86] PCT No.: PCT/FR96/01865

§ 371 Date: Aug. 11, 1999

§ 102(e) Date: Aug. 11, 1999

[87] PCT Pub. No.: WO97/21214

PCT Pub. Date: Jun. 12, 1997

[30] Foreign Application Priority Data

Dec. 4, 1995 [FR] France ................................. 95 14317

[51] Int. Cl.[7] .................................................. G11B 7/00
[52] U.S. Cl. ....................... 369/121; 369/44.37; 369/112
[58] Field of Search ............................... 369/121, 44.37, 369/44.23, 44.24, 112, 110, 109

[56] References Cited

U.S. PATENT DOCUMENTS 5,754,514  5/1998  Guerra ..................................... 369/126

FOREIGN PATENT DOCUMENTS

| 0 384 358 | 8/1990 | European Pat. Off. . |
| 2 627 311 | 8/1989 | France . |
| 55-084909 | 6/1980 | Japan . |

Primary Examiner—Nabil Hindi
Attorney, Agent, or Firm—Young & Thompson

[57] ABSTRACT

Optical reading device (1) for reading digital data from a reflecting medium (4), comprising a lighting source (8), means (10) for focusing the beam emitted by the source onto an area (S) of the medium, means (R) for receiving the light energy reflected and means (12) for processing the signals delivered by the receiving means. The device (1) comprises at least one second unfocused lighting means (E) installed on or near the reading device (1) so as to use its beam (F) to illuminate the focusing area (S) of the source (8) on the medium (4), the wavelength and the luminous power of this second lighting means (E) being chosen in such a way that the reproduction of the data is improved.

9 Claims, 1 Drawing Sheet

DEVICE FOR OPTICALLY READING DIGITAL DATA FROM A MEDIUM, PARTICULARLY A LASER DISK READER DEVICE

The invention relates to an optical reading device for reading digital data from a reflecting medium, this device being of the kind such as those which comprise a lighting source, means for focusing the beam emitted by the source onto an area of the medium, means for receiving the light energy reflected and means for processing the signals delivered by the receiving means.

The invention relates more particularly, but not exclusively, to such an optical reading device for laser-read disks, especially for audio disks.

The advantages of optically read digital data media are known. These media make it possible to store a large quantity of data in a reduced volume. Access to this data is fast and reading, which does not involve any mechanical contact, causes no wear to the medium. Furthermore, the quality of data reproduction is enhanced.

However, the digitizing of the data involves sampling which, for the low amplitude levels of the analog signal before digitization, may introduce data losses. Furthermore, the transferring of the digital data to the medium is necessarily accompanied by inaccuracies of manufacture, despite all the precautions taken. Additionally, the means for processing the signals provided for in the reading device involve one or more algorithms aimed at compensating for the data losses due to the inevitable imperfections of implementation, and at improving the signals reproduced.

Nevertheless, it is noted that, on reproduction of the data, there are still some points to be improved. In particular, in the case of laser-read audio disks, it is acknowledged that there is a degree of harshness and a degree of hardness to the sounds reproduced.

The purpose of the invention is, above all, to provide a device for optical reading by reflection, of the kind defined above which makes it possible to alleviate the drawbacks mentioned above, whilst remaining simple and relatively cheap.

According to the invention, an optical reading device for reading digital data from a reflecting medium, of the kind defined above, is characterized in that it comprises at least one second unfocused lighting means installed on or near the reading device so as to use its beam to illuminate the focusing area of the source on the medium, the wavelength and the luminous power of this second lighting means being chosen in such a way that the reproduction of the data is improved.

It has been noted, surprisingly, that the fitting of this second unfocused lighting means alleviated the aforesaid drawbacks; in particular, in the case of an optical reading device for laser-read disks, a noticeable difference in the reproduction of sounds has been noted when listening, the device of the invention improving the softness of reproduction and to a large extent removing the harshness and the hardness which are generally objected to when reading disks of this type.

The wavelength range of the second lighting means lies, preferably, in a region complementary to the wavelength range of the lighting source.

In the case of a source emitting in the red or the infrared, good results are obtained with a second lighting means emitting in the blue range of the visible spectrum. In particular, the second lighting means emits at a wavelength of 430 nanometers.

Means for adjusting the luminous power of emission of the second lighting means are advantageously provided.

This second lighting means preferably consists of a light-emitting diode. This diode is mounted in a supply circuit in series with an adjustable resistor. The user can adjust this resistor, especially in the case of the reading of an audio disk, to obtain the reproduction which seems preferable to him when listening.

The device of the invention can be applied not only to laser-read audio disks, but also to laser-read video disks.

The invention consists, apart from the provisions set out above, of a number of other provisions which will be dealt with more explicitly below in connection with an embodiment described together with references to the appended drawing, but which is in no way limiting.

FIG. 1 of this drawing, is a simplified diagram of an optical reading device according to the invention.

Figure 2:
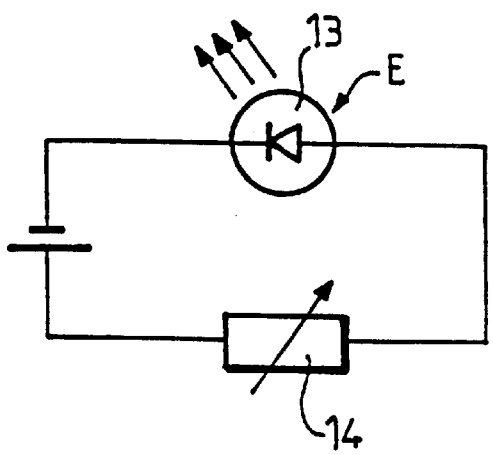

FIG. 2, lastly, is a diagram of the supply circuit of the second lighting means.

FIG. 1 of the drawing shows a reflection-based optical reading device 1 for reading digital information 2 from a medium 3. In the example considered the medium 3 is a laser-read audio disk which comprises a thin metallized reflecting layer 4 on which the digital information 2 corresponding to "0"s or to "1"s consist of pits or of flat areas of the metallized surface. In the example considered, the digital data 2 point downwards and the metallized layer 4 is covered, underneath, by a transparent layer 5 made in particular of polycarbonate. The reading device 1 is situated underneath the disk 3 with its optical axis perpendicular to the mid-plane of the disk. The digital data 2 are written as a spiral track. The disk 3 is rotated for reading while the reading device 1 is displaced radially.

The reading device 1 comprises, in the conventional manner, a frame 6, supported by means 7, represented in a cursory manner, allowing radial displacement thereof relative to the disk 3. The frame 6, of general cylindrical shape, with axis perpendicular to the disk 3, comprises a laser lighting source 8 at its lower part. This laser source 8 can emit, for example, in the red or the infrared, or in the blue. The laser beam is directed towards the disk 3 and passes through a semi-reflecting optical device 9, represented schematically, which can consist of a prism. An optical system 10, with servocontrol means (not represented), focuses the beam onto the digital data 2. The beam undergoes refraction at the interface between the air and the transparent layer 5. The focused spot S of the laser beam has reduced dimensions, of the order of two micrometers, matching the dimensions of the areas of the surface 4 constituting the digital data 2. Depending on whether the beam encounters a flat-surfaced area of the layer 4 or an area corresponding to a pit, the reflection will be stronger or weaker, and will result in a different digital datum, for example "1" or "0", on reading.

The reflected light returns to the semi-reflecting device 9 and is deflected through a right angle onto means R for receiving the luminous energy reflected and which consist of a reading photodiode 11. The signals from the photodiode 11 are sent to computerized processing means 12 involving algorithms suitable for making the necessary corrections and for compensating for the missing data in certain areas of the metallized layer 4. The signals leaving the processing means 12 subsequently serve to reproduce the sounds.

According to the invention, a second lighting means E, unfocused, is installed on or near the reading device 1 so as to use its beam F to illuminate the focusing area S of the source 8 on the support 3, 4. The dot of the luminous beam F on the metallized layer 4 has a markedly greater dimension than that of the focused spot S of the source 8 and it fills and surrounds this spot. The second lighting means E is fixed, for example to the frame 6, in such a way as to move with the reading device 1.

Surprisingly, it has been noted that by choosing the wavelength and, subsidiarily, the luminous power of this lighting means E, the sound reproduction is improved. On listening, the sounds produced by a device according to the invention exhibit greater softness than in the absence of the second lighting means E.

The wavelength range of the second lighting means E lies preferably in a region complementary to the wavelength range of the lighting source 8. In the case of a laser source 8 emitting in the red or the infrared, the second lighting means E preferably emits in the blue range of the visible spectrum, in particular at a wavelength of 430 nanometers. This second lighting means E advantageously consists of a light-emitting diode 13.

As illustrated in FIG. 2, the diode 13 is mounted in an electrical supply circuit comprising an adjustable resistor 14, constituting a means of adjustment on which the user may act in order to optimize the luminous intensity of the diode 13 and thereby tailor the effect on the reproduced sounds. The luminous energy received by the reading photodiode 11, from the second lighting means E, 13, should be markedly weaker than that from the source 8.

It is believed that this second lighting means consisting of the light-emitting diode 13 introduces averaged background noise which allows the system as a whole to be more selective and to achieve better reproduction of the digital data which, in the absence of this second lighting means, would be regarded as "0"s whereas it is actually "1" for which the datum 2 written in the layer 4 is more or less impaired.

An increase in the power of the laser source 8 would not produce an effect comparable to that of the second unfocused reading means E since such an increase in the power of the laser source would be accompanied by an increase in spurious interference.

The second lighting means E could be implemented using several light-emitting diodes or equivalent means.

What is claimed is:

1. Optical reading device for reading digital data from a reflecting medium (4), comprising a lighting source (8), means (10) for focusing the beam emitted by the source onto an area (S) of the medium, means (R) for receiving the light energy reflected and means (12) for processing the signals delivered by the receiving means, characterized in that it comprises at least one second unfocused lighting means (E) installed on or near the reading device (1) so as to use its beam (F) to illuminate the focusing area (S) of the source (8) on the medium (4), the wavelength and the luminous power of this second lighting means (E) being chosen in such a way that the reproduction of the data is improved.

2. Device according to claim 1, characterized in that the wavelength range of the second lighting means (E) lies in a region complementary to the wavelength range of the lighting source (8).

3. Device according to claim 1 or 2, in which the lighting source (8) emits in the red or the infrared, characterized in that the second lighting means (E) emits in the blue range of the visible spectrum.

4. Device according to claim 3, characterized in that the second lighting means (E) emits at a wavelength of 430 nanometers.

5. Device according to claim 1, characterized in that it comprises means (14) for adjusting the luminous power of emission of the second lighting means (E).

6. Device according to claim 1, characterized in that the second lighting means (E) consists of a light-emitting diode (13).

7. Device according to claim 5 together, characterized in that the light-emitting diode (13) of the second lighting means (E) is mounted in a supply circuit in series with an adjustable resistor (14) so as to optimize the luminous intensity thereof.

8. Reading device according to claim 1, comprising a laser lighting source (8) for reading audio disks.

9. Device according to claim 1, comprising a laser lighting source (8) for reading video disks.

* * * * *